Oct. 20, 1970      W. C. PORTMAN ET AL      3,535,029
CONTROL FOR MICROFILM VIEWER DRIVE
Filed Jan. 3, 1969      2 Sheets-Sheet 1

INVENTOR.
WARREN C. PORTMAN
NORMAN R. OLSEN
ALEX J. WEINSTEIN
BY
ATTORNEY.

United States Patent Office 3,535,029
Patented Oct. 20, 1970

3,535,029
CONTROL FOR MICROFILM VIEWER DRIVE
Warren C. Portman and Norman R. Olsen, Peekskill, and Alex J. Weinstein, Croton-on-Hudson, N.Y., assignors to The Ednalite Corporation, Peekskill, N.Y., a corporation of New York
Filed Jan. 3, 1969, Ser. No. 788,742
Int. Cl. G03b 23/12
U.S. Cl. 353—26          5 Claims

ABSTRACT OF THE DISCLOSURE

A microfilm viewer including a screen at the front of a housing superposed on a base defining a deck having reels rotatably mounted thereon at opposite sides of a film gate through which a film wound on the reels is moved for selection of the film frame to be viewed by projection on the screen, is provided with an electric motor powered, reversible, variable speed drive for the reels, an electric operating circuit for the motor including a reversing switch actuable to select the direction of operation of the drive and a potentiometer actuable to vary the speed of operation of the drive in either direction, a control shaft extending laterally through the base and having knobs at its opposite ends for manipulation by the left and right hands of a viewer positioned in front of the screen, and actuators for the reversing switch and the potentiometer which are driven from the control shaft.

---

This invention relates generally to microfilm viewers, and more particularly is directed to an improved control for the drive by which the film is moved in a microfilm viewer for selecting the film frame to be viewed.

In microfilm viewers, the film passes through a film gate between reels on which the film is wound, and a drive is provided for selectively rotating the reels so as to move the film through the gate and thereby select the film frame to be viewed by projection onto a screen. Although various arrangements have been proposed for controlling the operation of the drive, that is, for determining the speed and direction of movement of the film through the gate, such existing arrangements are all relatively awkward to operate, or at least are not operable with equal facility by a left-handed or a right-handed person, particularly when such person is disposed for optimum viewing of the screen. Further, the existing controls for determining the speed and direction in which the drive is made to move the film through the gate and for halting the film movement when the desired frame thereof is located in the gate are all relatively complex and do not afford a sufficient sensitivity of the control functions.

Accordingly, it is an object of the present invention to provide a microfilm viewer of the described character with a control for the drive thereof which is relatively simple and operable with equal facility by a left-handed or right-handed person located in the optimum position for viewing images projected on its screen.

According ot an aspect of this invention, a microfilm viewer including a screen at the front of a housing superposed on a base defining a deck having reels rotatable thereon at opposite sides of a film gate through which a film wound on the reels is moved for selection of the frame to be viewed by projection on the screen, is provided with reversible, variable speed electric motor means for driving the reels, electric circuit means for operating such motor means including reversing switch means actuable to select the direction of operation of the motor means and variable resistance means actuable to vary the speed of operation of said motor means in the selected direction, a control shaft extending laterally through the base and having knobs at its opposite ends disposed adjacent opposite sides of the base for convenient manipulation by the viewer's left and right hands, respectively, when the viewer is located in front of the screen, and actuating means driven from the control shaft to actuate the reversing switch means and the speed varying resistance means in response to manipulation of either of said knobs.

In preferred embodiments of the invention, the speed varying resistance means is in the form of a potentiometer having an angularly displaceable slider which, in a centered position, presents a resistance value to halt operation of the motor, that is, to stop the film in the gate, and, upon angular deviation from that centered position, presents resistance values to provide operating speeds of the motor means which increase with the extent of the angular deviation, and the actuating means is in the form of an actuating shaft coupled ot the control shaft, as by gears, and connected to the slider to turn the latter and cam means on the actuating shaft disposing the reversing switch means to cause operation of the motor means in opposite directions when the slider is angularly deviated from the centered position at opposite sides of the latter.

It is a further feature of the invention to provide an adjustable resistance in series with the speed varying resistance means, whereby to determine an adjustable range of movements of the slider from its centered position within which the total resistance value is still adequate to halt operation of the motor means. A detent is also advantageously associated with the control shaft to provide a characteristic yieldable resistance to rotation of the control shaft by the knobs thereon when such shaft is disposed to locate the slider in its centered position.

The above, and other objects, features and advantages of the invention, will be apparent in the following detailed description of illustrative embodiments thereof which is to be read in connection with the accompanying drawings, wherein.

Figure 1:
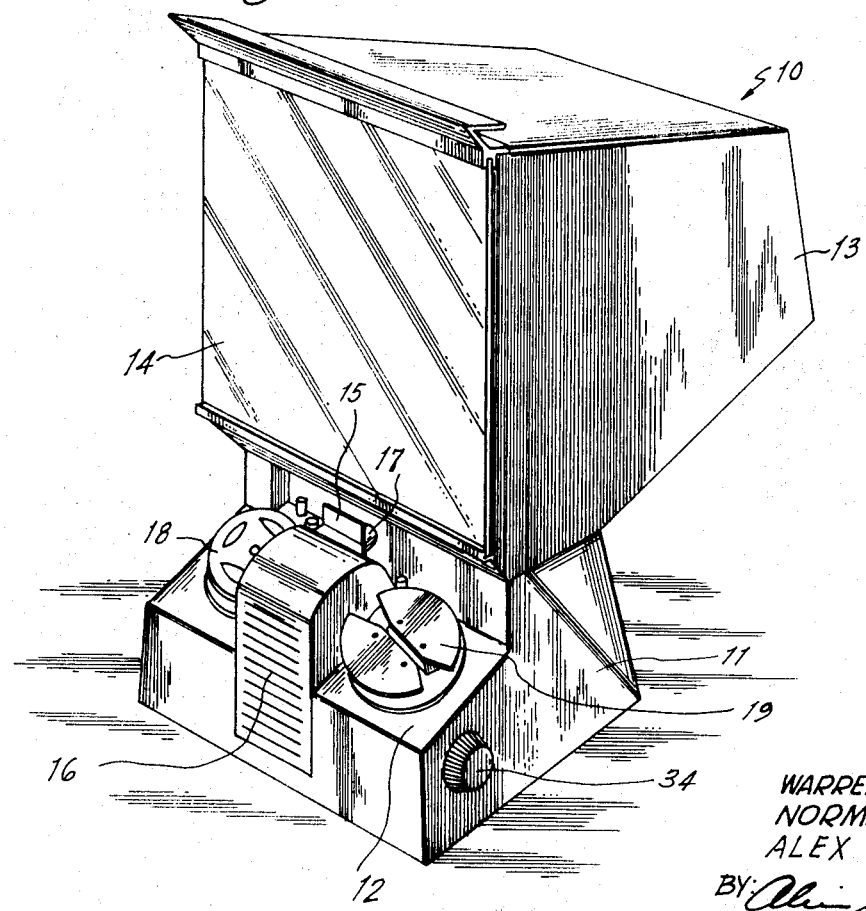
FIG. 1 is a perspective view of a microfilm viewer of a type particularly suited to have its drive controlled in accordance with this invention.

Referring to the drawings in detail, and initially to FIG. 1 thereof, it will be seen that a microfilm viewer 10 particularly suited to have its drive controlled in accordance with this invention may be of the type disclosed in detail in the copending application for U.S. Letters Patent on a Microfilm Viewer, filed Oct. 22, 1968, by Warren C. Portman and Alex J. Weinstein, which application is identified as Ser. No. 769,667. The viewer 10, as shown, generally comprises a hollow base 11 defining a shelf-like deck 12 extending across its forward portion and a housing 13 superposed on the back portion of base 11 and having its front constituted by a translucent screen 14 of glass or plastic.

A film gate 15 is mounted on deck 12 at a medial position and is adapted to slidably receive the film to be viewed. A condensing lens (not shown) in front of gate 15 is provided to direct a beam of light of uniform intensity through a film frame located in gate 15 from a suitable light source (not shown) arranged within a ventilated casing 16 at the center of deck 12. A lens assembly 17 is positioned in back of gate 15 and is operative to project a focused image of the film frame in the gate upon screen 14 by way of a reflector (not shown) in an angled position at the back of housing 13.

In order to select a particular frame to be positioned in gate 15 for viewing of the corresponding image on screen 14, the film is moved through the gate between reels 18 and 19 which are suitably mounted on spindles (not shown) for rotation above deck 12 at opposite sides of the gate and which have the film wound thereon. A drive (not shown) is provided within hollow base 11 for selectively driving the spindles of reels 18 and 19 in the directions to wind the film on the respective reels and thereby to move the film through gate 15 in one direction or the other. Such drive may be of the type disclosed in detail in the copending application for U.S. Letters Patent on Single Motor, Reversible Drive for the Flm Receiving Reels of Microfilm Viewers and the like, filed Dec. 24, 1968 by Warren C. Portman and Normal R. Olsen, which application is identified as Ser. No. 786,699, and has a common assignee herewith. The drive of the mentioned type may generally comprise a single reversible, variable speed electric motor indicated on FIG. 3 by its armature $A_1$ and its field winding $F_1$, for selectively driving each of the reels through a belt and pulley transmission, with an over-running clutch and a frictional coupling being interposed in series between each reel and the respective pulley of the transmission so as to drive such reel in the direction for winding the film thereon upon operation of the motor in the corresponding direction. Since this invention relates to the control of the motor, and not to the remainder of the drive by which operation of the motor is effective to drive one or the other of the reels 18 and 19 in the direction to wind film thereon, only the motor $A_1$, $F_1$ of the drive is shown on FIG. 3.

Figure 3:
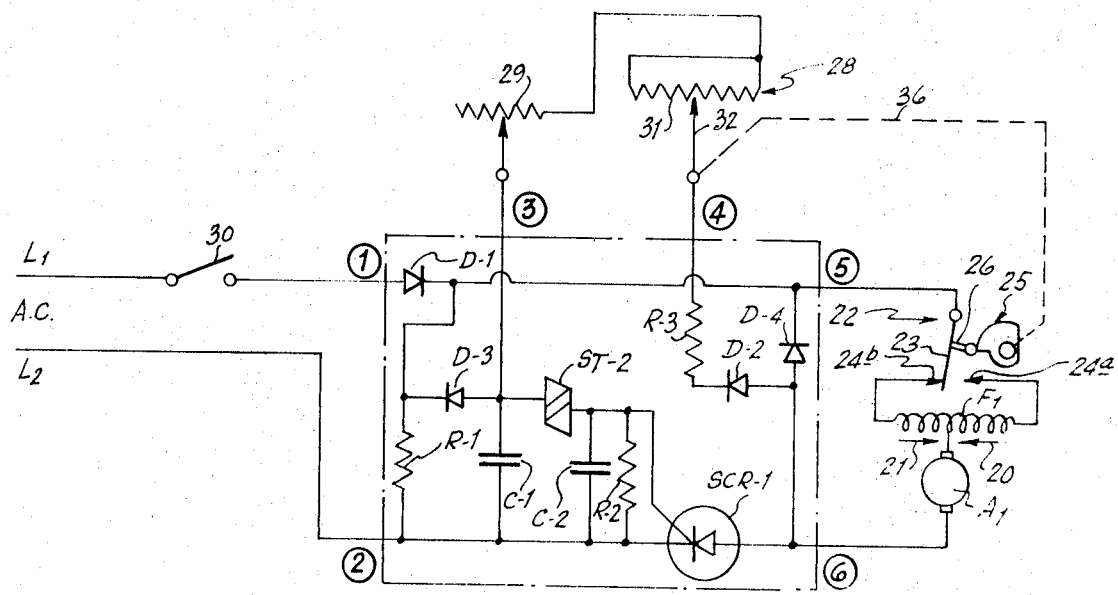
FIG. 3 is a circuit diagram showing one embodiment of the electrical components that may be associated with the mechanical assembly of FIG. 2.

In the embodiment shown on FIG. 3, the motor $A_1$, $F_1$ is a three-wire, reversible series type D.C. motor having its field winding $F_1$ split and in series with its armature $A_1$ so that, when current passes through one-half of the field winding in the direction of the arrow 20, the motor is turned in one direction and, when current is passed through the other half of the field winding in the direction of the arrow 21, the motor is turned in the opposite direction. The direction of current flow in field winding $F_1$ is determined by a reversing switch 22 having a movable contact 23 which may be spring urged into engagement with a fixed contact 24a to cause current flow in the direction 20 and is actuable away from contact 24a and into engagement with a fixed contact 24b to cause current flow in the direction 21. Thus, the direction of operation of the motor, and hence the driving of either reel 18 or reel 19 in the direction to wind the film thereon, is dependent upon the condition of switch 22.

In accordance with this invention, the condition of switch 22 is selectively determined by a radial cam 25 engageable at its periphery by a cam follower 26 connected with movable switch contact 23 to permit the latter to engage contact 24a when follower 26 rides on a radial small portion 25a (FIG. 2) of the cam, and to move contact 23 into engagement with contact 24b when cam 25 is turned to present a radially large portion 25b thereof to follower 26.

Further, the drive motor is intended to be operated in either direction y D.C. pulses of varied maximum voltage and duration whereby to vary the speed of such operation. As shown on FIG. 3, such D.C. pulses may be provided to the drive motor from an alternating current source $L_1$–$L_2$ by means of a commercially available circuit 27, for example, of the type designated as PC-60-P by Electro-Devices, Inc., of Paterson, N.J., and which is, in turn controlled by a speed regulating variable resistance or potentiometer 28 and also preferably by an adjustable resistance 29 in series with potentiometer 28.

The circuit 27 which, as such, forms no part of this invention, generally comprises a semiconductor controlled rectifier SCR–1, diodes D–1, D–2, D–3 and D–4, resistors R–1, R–2 and R–3, capacitors C–1 and C–2, and a trigger diode ST–2. Circuit 27 is connected with the A.C. source, preferably by way of an on-off switch 30, at terminals or connectors (1) and (2), with the series connected potentiometer 28 and adjustable resistance 29 at connectors (3) and (4), and with the series connected reversing switch 22 and the drive motor $A_1$–$f_1$ at connectors (5) and (6). As shown, the internal arrangement of the described components in circuit 27 connects SCR–1 in series with the drive motor to pass current through the latter only during each positive half-cycle of the A.C. source when SCR–1 is triggered to its "on" condition, and SCR–1 is returned to its "off" condition at the end of each positive half-cycle as the line voltage passes through zero. The delay angle of SCR–1, that is, the time during each positive half-cycle when SCR–1 is in its "off" condition to block the line voltage is determined by the magnitude of the total resistance presented by potentiometer 28 and adjustable resistance 29. When such total resistance is suitably high, the delay angle of SCR-1 may be coextensive with the positive half-cycle, whereby SCR–1 remains in its "off" condition and operation of the drive motor is prevented. However, when the total resistance presented by potentiometer 28 and adjustable resistance 29 is reduced below a predetermined value, the delay angle of SCR–1 is triggered to its "on" condition during each positive half-cycle with its conduction angle, that is, the period during which it is in its "on" condition, increasing progressively as the total resistance is progressively reduced below the aforementioned predetermined value.

The potentiometer 28 is shown to include a resistance element 31 having its ends connected to each other and a slider 32 movable along element 31 so that the later forms two parallel connected resistances. When slider 32 is in its illustrated central position, the two parallel resistances constituted by element 31 are equal and thus the effective resistance presented by potentiometer 28 is at a maximum. As slider 32 is deviated from its central position, one of the parallel connected resistances is increased while the other of the parallel connected resistances is reduced to correspondingly reduce the effective resistance presented by potentiometer 28. The potentiometer 28 is dimensioned so that, when its slider 32 is in its central position, the total of the resulting maximum effective resistance of potentiometer 28 and of less than the maximum resistance of adjustable resistance 29 will be greater than the predetermined value of the total resistance at which operation of the drive motor is commenced. Accordingly, by adjusting resistance 29 in series with potentiometer 28 it is possible to vary the extent of the deviation of slider 32 from its central position that must be effected before operation of the drive motor is commenced. Obviously, as the deviation of slider 32 from its central position is increased in either direction, the total resistance of potentiometer 28 and resistance 29 is correspondingly decreased to a minimum value determined by the setting of resistance 29 and which corresponds to a maximum conduction angle of SCR–1 and hence to a maximum speed of the drive motor.

Although the particular circuit 27, as shown, controls D.C. pulses to the drive motor during alternate half-cycles of the A.C. supply, it will be apparent that other commercially available control circuits similarly controllable by potentiometer 28 and adjustable resistance 29 may be substituted therefor to control D.C. pulses to the drive motor during each half-cycle of the A.C. supply.

Figure 2:
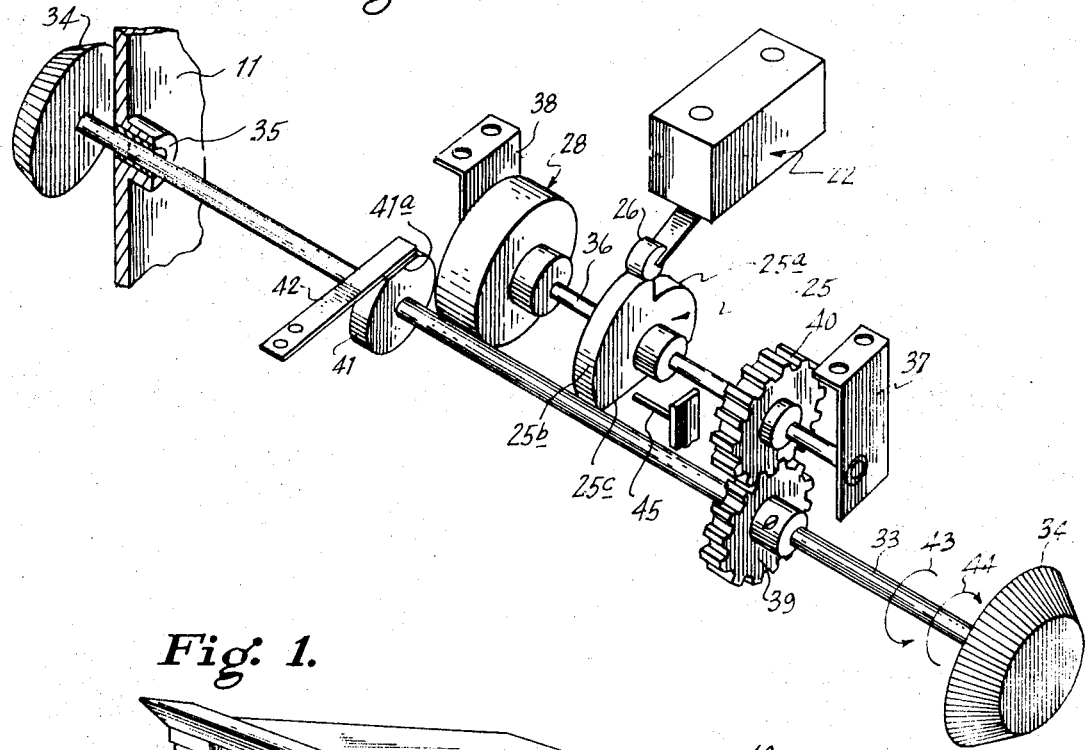
FIG. 2 is an enlarged perspective view of the mechanical components of a control according to this invention for the drive of the microfilm viewer shown on FIG. 1.

Referring now to FIG. 2, it will be seen that a control for a microfilm viewer drive according to this invention further includes a control shaft 33 having knobs 34 secured on its opposite ends and being journalled in bearings 35 in the sides of base 11 so that shaft 33 extends laterally across base 11 and the knobs are disposed outside the sides of the base (FIG. 1). An actuating shaft 36 extending parallel to shaft 33 within base 11 has one end journalled in a bracket 37 and its other end secured to the slider of potentiometer 28 which has its housing fixed to a bracket 38. The cam 25 for actuating reversing switch 22 is secured on shaft 36 and the latter is driven from shaft 33, as by gears 39 and 40.

Cam 25 is angularly positioned on shaft 36 so that the division between its radially small and large portions 25a and 25b will be presented to cam follower 26, as shown on FIG. 2, when the slider of potentiometer 28 is at its central position. Further, the disposition of shaft 36 in the illustrated neutral position is made apparent to the operator of the microfilm viewer by providing a detent, for example, as constituted by a disk 41 secured on shaft 33 and having a flattened peripheral region 41a engaged by a suitably mounted leaf spring 42, so that a yieldable resistance to turning of shaft 33 is felt when such shaft is in the position to dispose the slider of potentiometer 28 in its central position.

It will be apparent that turning of shaft 33 in the direction of the arrow 43 (FIG. 2) will cause portion 25b of cam 25 to engage follower 26 and thereby engage contact 23 of switch 22 with contact 24b, and at the same time will deviate the slider 32 of potentiometer 28 from its central position, thereby to decrease the effective resistance of the potentiometer. Upon a predetermined angular deviation of slider 32, which of course depends on the setting of adjustable resistance 29, the drive motor $A_1$, $F_1$ will commence operation in the direction determined by swicth 22. As the shaft 34 is further turned in the direction of arrow 43, the operating speed of the drive motor will be correspondingly increased. On the other hand, when shaft 33 is turned in the direction of the arrow 44 from the position shown on FIG. 2, portion 25a of the cam 25 will be engaged by follower 26 to permit contact 23 of switch 22 to engage contact 24a of the latter, and thereby reverse the direction of operation of the drive motor upon the angular deviation of the slider of potentiometer 28 to the extent necessary for the commencement of motor operation. Thus, merely by manipulation of one or the other of knobs 34, it is possible to cause the operation of the drive motor in one direction or the other at a varied speed, or to halt the operation of the motor, as by the return of shaft 33 to the illustrated position.

In order to limit the turning of shaft 36 to approximately 180° in each direction from the neutral position shown, as is necessary to prevent damage to potentiometer 28, cam 25 may be provided with a flat side 25c which is engageable with a suitably fixed stop pin 45 at each desired limit of the turning of shaft 36.

Figure 4:
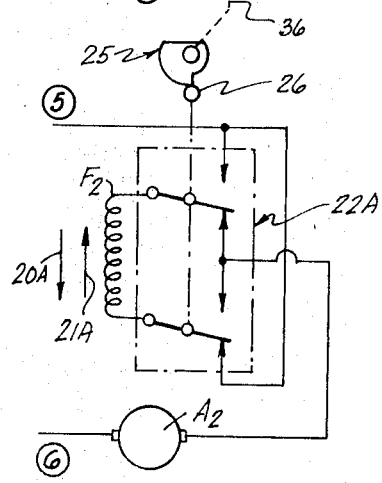
FIGS. 4 and 5 are fragmentary circuit diagrams showing two modifications of the electrical components illustrated by FIG. 3.

While the control according to this invention has been described with reference to FIG. 3 in connection with a three-wire, reversible series type D.C. motor, it will be apparent that the same control can be employed with a fourwire, reversible series type D.C. motor as indicated at $A_2$, $F_2$ on FIG. 4. In the later case, a two-pole reversing switch 22A is substituted for the switch 22 so that, when such switch 22A is in the position shown, the D.C. pulses for operating the drive motor will flow through its field winding $F_2$ in the direction of the arrow 21A to cause operation of the motor in one direction. When switch 22A is permitted by cam 25 to return to its spring urged condition, the pulses for operating the drive motor flow through its field winding in the opposite direction, as indicated by arrow 20A, to reverse the direction of operation of the motor.

Figure 5:
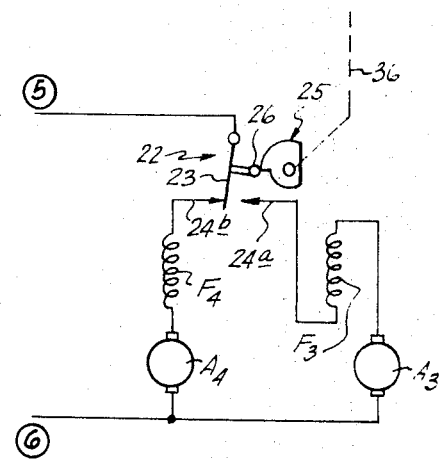

Further, the control according to this invention may be employed in connection with other microfilm viewer drives, for example, drives in which an individual motor is provided for each of the reels 18 and 19. Thus, as shown on FIG. 5, a series type D.C. motor having an armature $A_3$ and field winding $F_3$ may be coupled to reel 18 and a similar motor having an armature $A_4$ and field winding $F_4$ may be coupled to reel 19, with armature $A_3$ and winding $F_3$ being in series between contact 24a of switch 22 and connector (6), and armature $A_4$ and winding $F_4$ being in series between contact 24b and connector (6). It will be apparent that, when switch 22 is in the condition shown, motor $A_4$, $F_4$ is operated in the direction to wind film on reel 19 while the inoperative motor $A_3$, $F_3$ acts as a drag on the unwinding of film from reel 18. Conversely, when cam 25 is turned to permit contact 23 to engage contact 24a, motor $A_3$, $F_3$ is operated in the direction to wind film on reel 18 and the other inoperative motor acts as a drag on the unwinding of film from reel 19.

With the control for a microfilm viewer drive according to this invention, a person standing or seated in front of screen 14 for optimum viewing of an image projected thereon, can conveniently operate the control with equal facility by either the right or left hand. Further, the control functions, that is, speed of movement of the film in either direction, the direction of film movement and the halting of film movements, are all realized by simple manipulation of one or the other of the knobs 34, with the detent structure 41, 42 providing a characteristic "feel" when the neutral position for stopping film movement is attained. It is also apparent that adjustment of the resistance 29 permits variation of the sensitivity of the control, that is, variation of the extent of turning of knobs 34 from the neutral position to commence the film movement in either direction.

Although illustrative embodiments of the invention have been described in detail herein with reference to the drawings, it is to be understood that the invention is not limited to that precise embodiment, and that various changes and modifications may be effected therein without departing from the scope or spirit of the invention.

What is claimed is:

1. In a microfilm viewer including a screen at the front of a housing superposed on a base and a deck having reels rotatably mounted thereon at opposite sides of a film gate through which a film wound on said reels is moved for selection of the film frame to be viewed by projection onto said screen; the combination of reversible, variable speed electric motor means for driving said reels, electric circuit means for operating said motor means including reversing switch means actuable to select the direction of operation of said motor means and variable resistance means actuable to vary the speed of operation of said motor means in the selected direction, a control shaft extending laterally through said base and having knobs on its opposite ends disposed adjacent opposite sides of said base for manipulation by the viewer's left and right hands, respectively, and actuating means driven from said shaft to actuate said switch means and said variable resistance means.

2. A microfilm viewer according to claim 1, in which said variable resistance means consists of a potentiometer having an angularly displaceable slider which, in a centered position, presents a resistance value to halt operation of said motor means and, upon angular deviation from said centered position, presents resistance values to provide operating speeds of said motor means which increase with the extent of said angular deviation, and in which said actuating means includes an actuating shaft rotatably coupled to said control shaft and connected to said slider to turn the latter, and cam means on said actuating shaft disposing said switch means in one condition to cause operation of said motor means in one direction when said slider is deviated in one direction from said centered position and disposing said switch means in another condition to cause operation of said motor means in the opposite direction when said slider is deviated in the other direction from said centered position.

3. A microfilm viewer according to claim 2, in which detent means is associated with one of said control and actuating shafts to indicate when said slider is in said centered position.

4. A microfilm viewer according to claim 3, in which an adjustable resistance means is in series with said variable resistance means to provide an adjustable range of movements of said slider from said centered position within which the total resistance value of said variable and adjustable resistance means are adequate to halt operation of said motor means.

5. A microfilm viewer according to claim 2, in which an adjustable resistance means is in series with said variable resistance means to provide an adjustable range of movements of said slider from said centered position within which the total resistance value of said variable and adjustable resistance means are adequate to halt operation of said motor means.

References Cited

UNITED STATES PATENTS 2,464,220  3/1949  Duncan et al. _____ 353—26
3,183,771  5/1965  Rutkus _____ 353—27
3,480,358  11/1969 Brownscombe _____ 353—26

FOREIGN PATENTS 550,225  12/1942  Great Britain.

LOUIS R. PRINCE, Primary Examiner

J. W. ROSKOS, Assistant Examiner

U.S. Cl. X.R.

40—31, 106.1; 352—129